(12) United States Patent
Tanaka

(10) Patent No.: US 9,500,965 B2
(45) Date of Patent: Nov. 22, 2016

(54) ELECTROPHOTOGRAPHIC PHOTOSENSITIVE MEMBER, PROCESS CARTRIDGE, AND ELECTROPHOTOGRAPHIC APPARATUS, AND GALLIUM PHTHALOCYANINE CRYSTAL

(71) Applicant: CANON KABUSHIKI KAISHA, Tokyo (JP)

(72) Inventor: Masato Tanaka, Tagata-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/442,399

(22) PCT Filed: Dec. 3, 2013

(86) PCT No.: PCT/JP2013/082900
§ 371 (c)(1),
(2) Date: May 12, 2015

(87) PCT Pub. No.: WO2014/092033
PCT Pub. Date: Jun. 19, 2014

(65) Prior Publication Data
US 2016/0238956 A1     Aug. 18, 2016

(30) Foreign Application Priority Data

Dec. 14, 2012  (JP) .................................. 2012-273718
Nov. 27, 2013  (JP) .................................. 2013-245137

(51) Int. Cl.
*G03G 5/04*  (2006.01)
*G03G 5/06*  (2006.01)
*G03G 21/18*  (2006.01)

(52) U.S. Cl.
CPC ............ *G03G 5/0696* (2013.01); *G03G 21/18* (2013.01)

(58) Field of Classification Search
CPC .......................... G03G 5/0696; G03G 5/0675
See application file for complete search history.

(56) References Cited

U.S. PATENT DOCUMENTS

| 5,811,212 A | 9/1998 | Tanaka |
| 6,245,472 B1 | 6/2001 | Tanaka |
| 6,335,132 B1 | 1/2002 | Tanaka et al. |
| 6,472,524 B2 | 10/2002 | Tanaka |
| 8,518,615 B2 | 8/2013 | Tanaka |
| 8,886,092 B2 | 11/2014 | Saito et al. |
| 8,974,991 B2 | 3/2015 | Kawahara et al. |
| 9,068,083 B2 | 6/2015 | Tanaka et al. |
| 2005/0240051 A1 | 10/2005 | Yasuda et al. |
| 2014/0170542 A1 | 6/2014 | Tanaka |
| 2014/0170543 A1 | 6/2014 | Tanaka |
| 2014/0308606 A1 | 10/2014 | Tanaka et al. |

FOREIGN PATENT DOCUMENTS

| EP | 1 063 572 | 12/2000 | |
| EP | 1 130 475 | 9/2001 | |
| JP | 10-48858 A | 2/1998 | |
| JP | 2001-66804 A | 3/2001 | |
| JP | 2002-229228 A | 8/2002 | |
| JP | 2002-255968 A | 9/2002 | |
| JP | 2004-093797 * | 3/2004 | ............... G03G 5/05 |
| JP | 2004-93797 A | 3/2004 | |
| JP | 2004-125907 A | 4/2004 | |
| JP | 2004-233674 A | 8/2004 | |
| JP | 2004-239955 A | 8/2004 | |
| JP | 2005-258020 A | 9/2005 | |
| JP | 2006-72304 A | 3/2006 | |
| JP | 2006-259387 A | 9/2006 | |
| JP | 2009-251507 A | 10/2009 | |
| JP | 2010-160475 A | 7/2010 | |
| JP | 2011-94101 A | 5/2011 | |
| WO | 2004/039483 A1 | 5/2004 | |

OTHER PUBLICATIONS

Translation of JP 2004-093797 published on Mar. 2004.*
U.S. Appl. No. 14/680,040, filed Apr. 6, 2015. Inventor: Masato Tanaka, et al.
U.S. Appl. No. 14/689,364, filed Apr. 17, 2015. Inventor: Junpei Kuno, et al.
U.S. Appl. No. 14/730,482, filed Jun. 4, 2015. Inventor: Masato Tanaka, et al.

U.S. Appl. No. 14/722,985, filed May 27, 2015. Inventor: Masataka Kawahara, et al.
U.S. Appl. No. 14/721,307, filed May 26, 2015. Inventor: Masataka Kawahara, et al.
U.S. Appl. No. 14/689,341, filed Apr. 17, 2015. Inventor: Junpei Kuno, et al.
U.S. Appl. No. 14/646,378, filed May 20, 2015. Inventor: Masato Tanaka, et al.
PCT International Search Report and Written Opinion of the International Searching Authority, International Application No. JP2013/082900, Mailing Date Mar. 11, 2014.

\* cited by examiner

*Primary Examiner* — Peter Vajda
(74) *Attorney, Agent, or Firm* — Fitzpatrick, Cella, Harper & Scinto

(57) ABSTRACT

Provided are an electrophotographic photosensitive member capable of outputting an image having less image defects due to the ghost phenomenon not only under a normal-temperature and normal-humidity environment but also under a low-temperature and low-humidity environment as a particularly severe condition, and a process cartridge and an electrophotographic apparatus each including the electrophotographic photosensitive member. The electrophotographic photosensitive member is an electrophotographic photosensitive member including a photosensitive layer, in which the photosensitive layer includes a gallium phthalocyanine crystal in which a compound represented by the following formula (1) or the following formula (2) is contained.

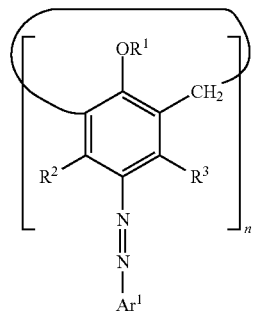

Formula (1)

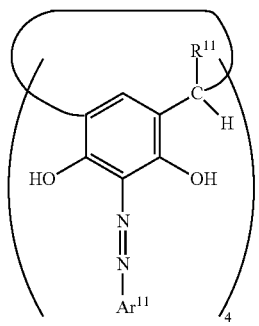

Formula (2)

19 Claims, 2 Drawing Sheets

ELECTROPHOTOGRAPHIC PHOTOSENSITIVE MEMBER, PROCESS CARTRIDGE, AND ELECTROPHOTOGRAPHIC APPARATUS, AND GALLIUM PHTHALOCYANINE CRYSTAL

TECHNICAL FIELD

The present invention relates to an electrophotographic photosensitive member, a process cartridge and an electrophotographic apparatus each including the electrophotographic photosensitive member, and a gallium phthalocyanine crystal.

BACKGROUND ART

An oscillation wavelength of semiconductor laser, which has been frequently used as an image exposing device of an electrophotographic photosensitive member is, at present, a long wavelength such as 650 to 820 nm. Accordingly, development of an electrophotographic photosensitive member having high sensitivity to light having such a long wavelength has been advanced.

A phthalocyanine pigment is effective as a charge-generating substance having high sensitivity to light having a wavelength in such a long-wavelength region. In particular, oxytitanium phthalocyanine and a gallium phthalocyanine have excellent sensitivity characteristics, and various crystal forms thereof have been reported heretofore.

An electrophotographic photosensitive member using the phthalocyanine pigment has an excellent sensitivity characteristic. However, the electrophotographic photosensitive member involves the following problem. A produced photocarrier is liable to remain on its photosensitive layer and is liable to serve as one kind of memory to cause an electric potential variation such as a ghost phenomenon.

In addition, Patent Literature 1 reports the following. When the pigment and a specific organic electron acceptor are subjected to a wet pulverization treatment, the organic electron acceptor is taken in a surface of the crystal simultaneously with crystal transformation, and hence the electrophotographic characteristics are improved.

In addition, Patent Literatures 2 and 3 disclose that an azotized calixarene compound or a resorcinarene compound is used in the photosensitive layer. The compound is used in an attempt to alleviate the ghost phenomenon.

CITATION LIST

Patent Literature

PTL 1: Japanese Patent Application Laid-Open No. 2006-72304
PTL 2: Japanese Patent Application Laid-Open No. 2001-66804
PTL 3: Japanese Patent Application Laid-Open No. 2002-229228

SUMMARY OF INVENTION

Technical Problem

As described above, various improvements have been attempted for an electrophotographic photosensitive member.

However, the additional alleviation of the deterioration of image quality due to a ghost phenomenon under various environments has been desired in association with an additional improvement in image quality in recent years. The method disclosed in Patent Literature 1 has room for improvement because a phthalocyanine crystal to be obtained in the method does not contain an organic electron acceptor inside thereof and merely has the acceptor mixed therewith or adhering to its surface. The method disclosed in each of Patent Literatures 2 and 3 has room for further improvement in the suppression of image quality deterioration due to the ghost phenomenon.

In view of the foregoing, the present invention is directed to providing an electrophotographic photosensitive member capable of outputting an image having less image defects due to the ghost phenomenon not only under a normal-temperature and normal-humidity environment but also under a low-temperature and low-humidity environment as a particularly severe condition, and a process cartridge and an electrophotographic apparatus each including the electrophotographic photosensitive member.

Further, the present invention is directed to providing a gallium phthalocyanine crystal in which a specific compound is contained.

Solution to Problem

According to one aspect of the present invention, there is provided an electrophotographic photosensitive member including a support and a photosensitive layer formed on the support, in which the photosensitive layer includes a gallium phthalocyanine crystal in which a compound represented by the following formula (1) is contained.

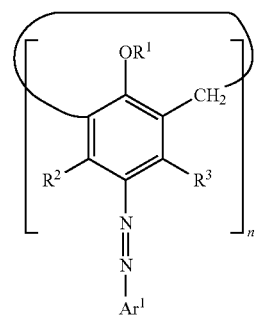

Formula (1)

(In the formula (1), n represents an integer selected from 4 to 8, n pieces of $R^1$ may be identical or different from each other, and represent a hydrogen atom or a substituted or unsubstituted alkyl group, n pieces of $R^2$ may be identical or different from each other, and represent a hydrogen atom or an alkyl group, n pieces of $R^3$ may be identical or different from each other, and represent a hydrogen atom or an alkyl group, and n pieces of $Ar^1$ may be identical or different from each other, and represent a substituted or unsubstituted aromatic hydrocarbon ring group, a substituted or unsubstituted hetero ring group, or a mono-valent group formed by a combination of a plurality of groups selected from the group consisting of a substituted aromatic hydrocarbon ring group, an unsubstituted aromatic hydrocarbon ring group, a substituted hetero ring group, and an unsubstituted hetero ring group.)

According to another aspect of the present invention, there is provided an electrophotographic photosensitive member including a support and a photosensitive layer formed on the support, in which the photosensitive layer includes a gallium phthalocyanine crystal in which a compound represented by the following formula (2) is contained.

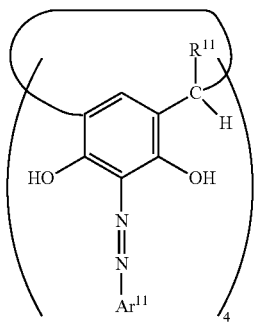

Formula (2)

(In the formula (2), four pieces of $R^{11}$ may be identical or different from each other, and represent a hydrogen atom, a substituted or unsubstituted alkyl group, or a substituted or unsubstituted aryl group, and four pieces of $Ar^{11}$ may be identical or different from each other, and represent a substituted or unsubstituted aromatic hydrocarbon ring group, a substituted or unsubstituted hetero ring group, or a mono-valent group formed by a combination of a plurality of groups selected from the group consisting of a substituted aromatic hydrocarbon ring group, an unsubstituted aromatic hydrocarbon ring group, a substituted hetero ring group, and an unsubstituted hetero ring group.)

According to further aspect of the present invention, there is provided a process cartridge detachably mountable to a main body of an electrophotographic apparatus, in which the process cartridge integrally supports: the above-described electrophotographic photosensitive member; and at least one device selected from the group consisting of a charging device, a developing device, a transferring device, and a cleaning device.

According to still further aspect of the present invention, there is provided an electrophotographic apparatus including: the above-described electrophotographic photosensitive member; a charging device; an image exposing device; a developing device; and a transferring device.

According to still further aspect of the present invention, there is provided a gallium phthalocyanine crystal in which a compound represented by the formula (1) or the formula (2) is contained.

Advantageous Effects of Invention

According to the present invention, there are provided the electrophotographic photosensitive member capable of outputting an image having less image defects due to the ghost phenomenon not only under a normal-temperature and normal-humidity environment but also under a low-temperature and low-humidity environment as a particularly severe condition, and the process cartridge and the electrophotographic apparatus each including the electrophotographic photosensitive member.

Further, according to the present invention, provide is the gallium phthalocyanine crystal having excellent characteristics as a charge-generating substance.

Further features of the present invention will become apparent from the following description of exemplary embodiments with reference to the attached drawings.

DESCRIPTION OF EMBODIMENTS

Figure 1:
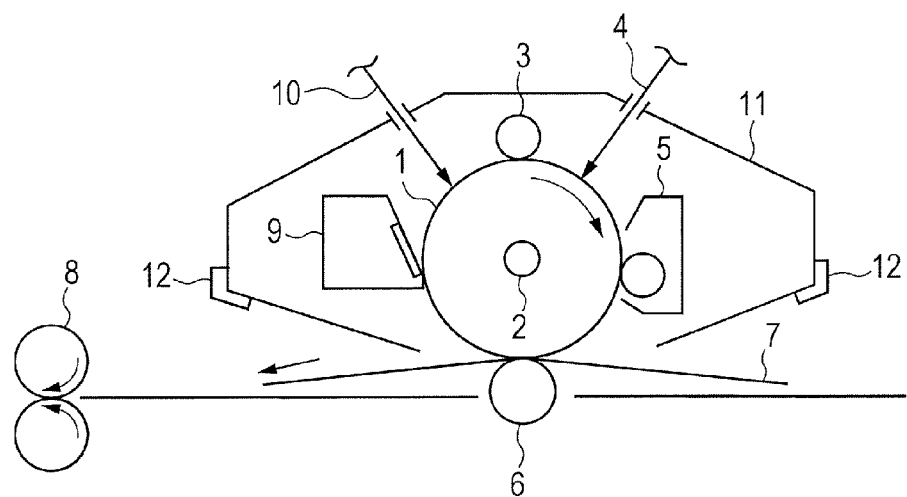
FIG. 1 is a view illustrating an example of a schematic configuration of an electrophotographic apparatus including a process cartridge having an electrophotographic photosensitive member.

As described above, an electrophotographic photosensitive member of present invention includes a support and a photosensitive layer formed on the support. The photosensitive layer includes a gallium phthalocyanine crystal in which an amine compound represented by the following formula (1) is contained.

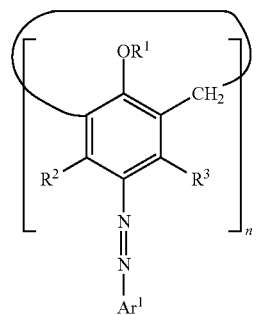

Formula (1)

(In the formula (1), n represents an integer selected from 4 to 8, n pieces of $R^1$ may be identical or different from each other, and represent a hydrogen atom or a substituted or unsubstituted alkyl group, n pieces of $R^2$ may be identical or different from each other, and represent a hydrogen atom or an alkyl group, n pieces of $R^3$ may be identical or different from each other, and represent a hydrogen atom or an alkyl group, and n pieces of $Ar^1$ may be identical or different from each other, and represent a substituted or unsubstituted aromatic hydrocarbon ring group, a substituted or unsubstituted hetero ring group, or a mono-valent group formed by a combination of a plurality of groups selected from the group consisting of a substituted aromatic hydrocarbon ring group, an unsubstituted aromatic hydrocarbon ring group, a substituted hetero ring group, and an unsubstituted hetero ring group.)

In addition, at least two pieces of $R^1$ in the formula (1) preferably represent an alkyl group.

In addition, at least one piece of $Ar^1$ in the formula (1) preferably represents a phenyl group having at least one group selected from the group consisting of a cyano group, a nitro group, and a halogen atom. In particular, at least one piece of $Ar^1$ more preferably represents a phenyl group having one of a cyano group and a nitro group at a meta-position thereof.

In addition, in the present invention, the photosensitive layer of the electrophotographic photosensitive member includes a gallium phthalocyanine crystal in which a compound represented by the following formula (2) is contained.

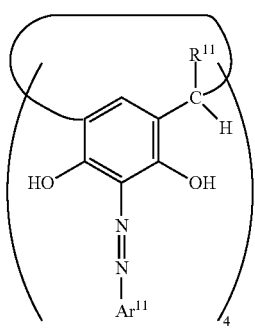

Formula (2)

(In the formula (2), four pieces of $R^{11}$ may be identical or different from each other, and represent a hydrogen atom, a substituted or unsubstituted alkyl group, or a substituted or unsubstituted aryl group, and four pieces of $Ar^{11}$ may be identical or different from each other, and represent a substituted or unsubstituted aromatic hydrocarbon ring group, a substituted or unsubstituted hetero ring group, or a mono-valent group formed by a combination of a plurality of groups selected from the group consisting of a substituted aromatic hydrocarbon ring group, an unsubstituted aromatic hydrocarbon ring group, a substituted hetero ring group, and an unsubstituted hetero ring group.)

In addition, all the four pieces of $R^{11}$ in the formula (2) preferably represent an alkyl group.

In addition, at least one piece of $Ar^{11}$ in the formula (2) preferably represents a phenyl group having at least one group selected from the group consisting of a cyano group, a nitro group, and a halogen atom. In particular, at least one piece of $Ar^{11}$ more preferably represents a phenyl group having one of a cyano group and a nitro group at a meta-position thereof.

In addition, examples of the aromatic hydrocarbon ring group or the hetero ring group include: hydrocarbon-based aromatic ring groups such as benzene, naphthalene, fluorene, phenanthrene, anthracene, fluoranthene, and pyrene; and hetero ring groups such as furan, thiophene, pyridine, indole, benzothiazole, carbazole, benzocarbazole, acridone, dibenzothiophene, benzoxazole, benzotriazole, oxathiazole, thiazole, phenazine, cinnoline, and benzocinnoline. Further, examples of the group formed by combining the aromatic hydrocarbon ring groups or the hetero ring groups directly or through an aromatic group or non-aromatic group (sometimes referred to as group formed by a combination of a plurality of aromatic hydrocarbon ring groups or a plurality of hetero ring groups) include triphenylamine, diphenylamine, N-methyldiphenylamine, biphenyl, terphenyl, binaphthyl, fluorenone, phenanthrenequinone, anthraquinone, benzanthrone, diphenyloxazole, phenylbenzoxazole, diphenylmethane, diphenyl sulfone, diphenyl ether, benzophenone, stilbene, distyrylbenzene, tetraphenyl-p-phenylenediamine, and tetraphenylbenzidine.

In addition, examples of the alkyl group include a methyl group, an ethyl group, a propyl group, a butyl group, a hexyl group, an undecyl group, and a tridecyl group.

Examples of the substituent that each of the groups (substituted alkyl group, substituted aromatic hydrocarbon ring group, substituted hetero ring group, and substituted aryl group) may have include: alkyl groups such as methyl, ethyl, propyl, and butyl; alkoxy groups such as methoxy and ethoxy; dialkylamino groups such as dimethylamino and diethylamino; alkoxycarbonyl groups such as methoxycarbonyl and ethoxycarbonyl; halogen atoms such as a fluorine atom, a chlorine atom, and a bromine atom; a hydroxy group; a nitro group; a cyano group; an acetyl group; and a halomethyl group.

Hereinafter, a preferred specific example (Exemplified Compound) of a compound that is contained in a gallium phthalocyanine crystal of the present invention and is represented by the formula (1) or (2) is described. However, the present invention is not limited thereto.

Exemplified Compound (1-1)

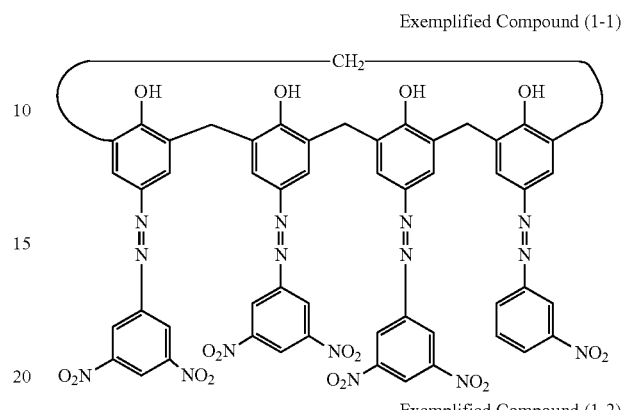

Exemplified Compound (1-2)

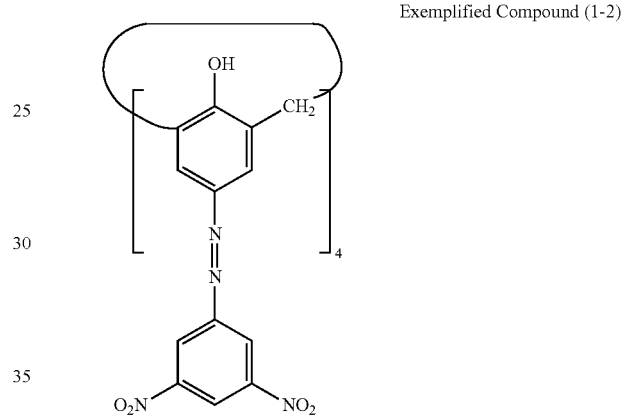

Exemplified Compound (1-3)

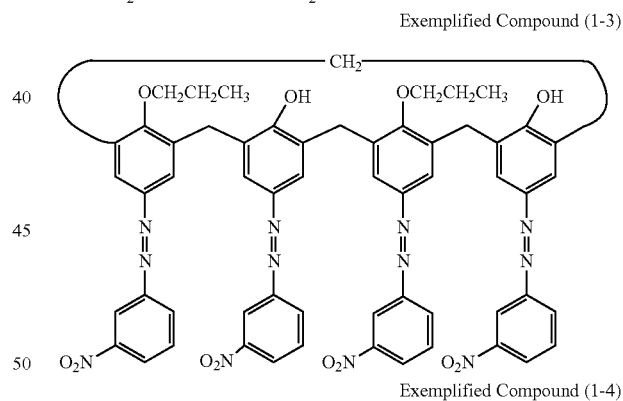

Exemplified Compound (1-4)

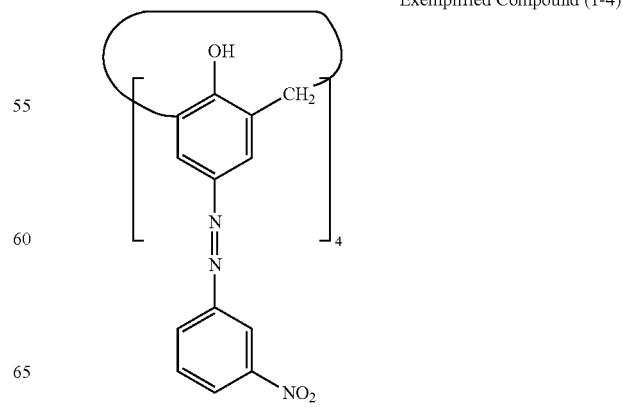

Exemplified Compound (1-5)
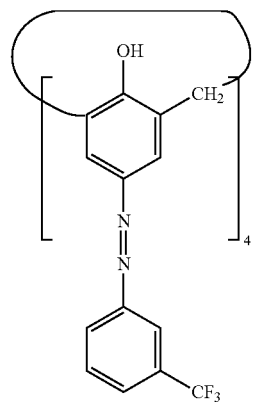
Exemplified Compound (1-6)
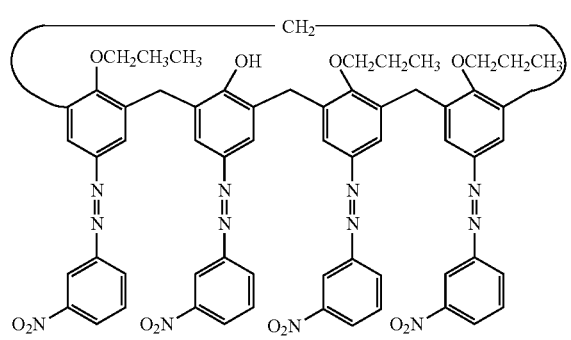
Exemplified Compound (1-7)
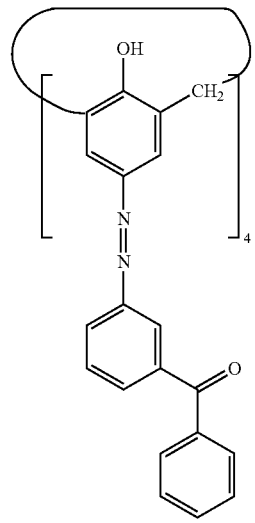
Exemplified Compound (1-8)
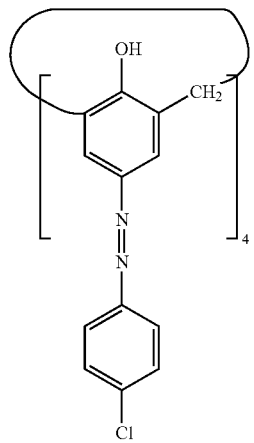
Exemplified Compound (1-9)
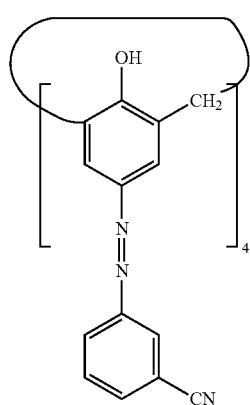
Exemplified Compound (1-10)
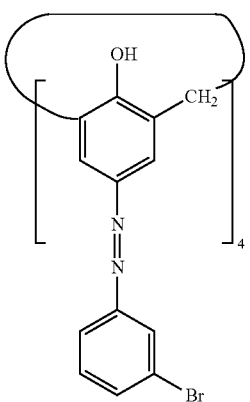
Exemplified Compound (1-11)
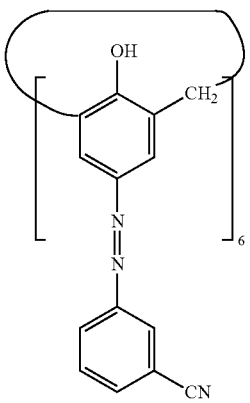

Exemplified Compound (1-12)
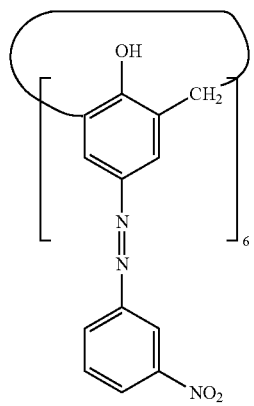
Exemplified Compound (1-13)
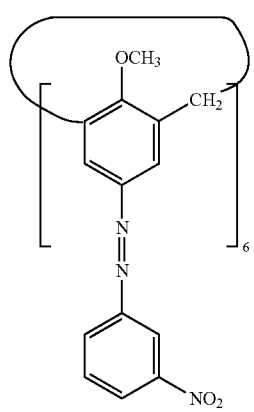
Exemplified Compound (1-14)
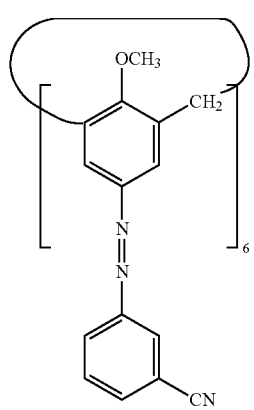
Exemplified Compound (1-15)
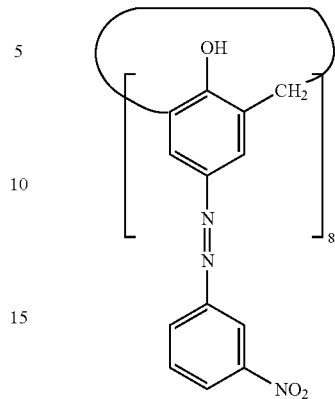
Exemplified Compound (1-16)
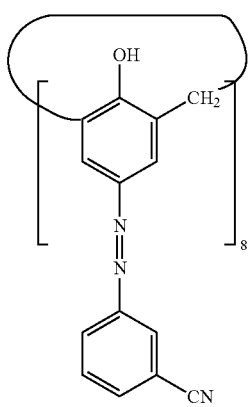
Exemplified Compound (1-17)
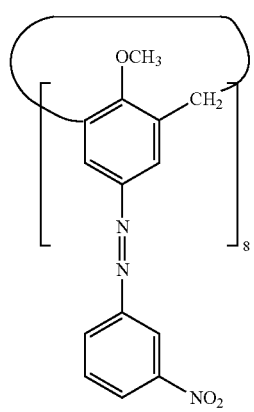

Exemplified Compound (1-18)
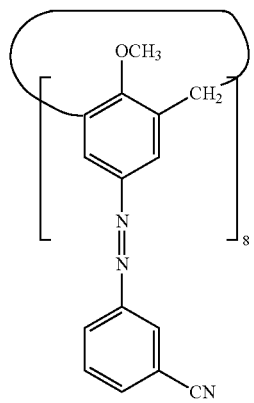
Exemplified Compound (1-19)
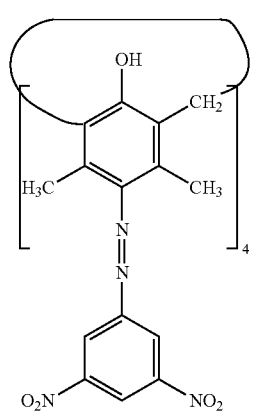
Exemplified Compound (2-1)
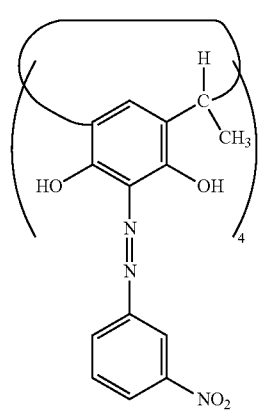
Exemplified Compound (2-2)
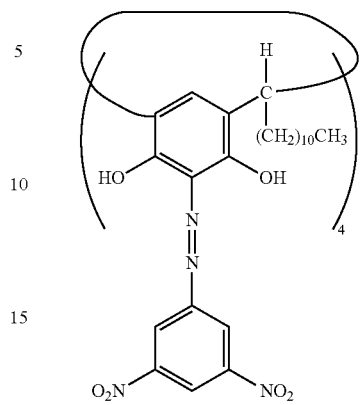
Exemplified Compound (2-3)
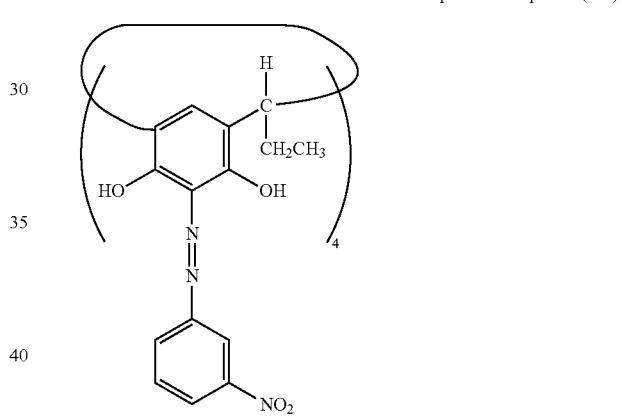
Exemplified Compound (2-4)
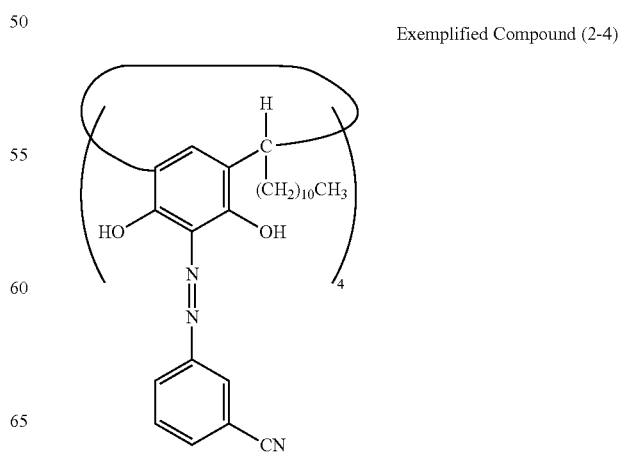

Exemplified Compound (2-5)

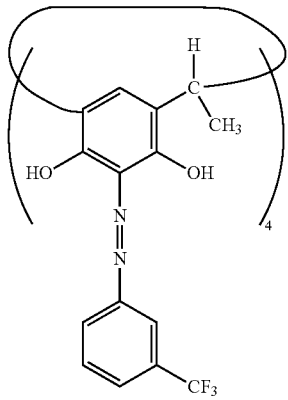

Exemplified Compound (2-6)

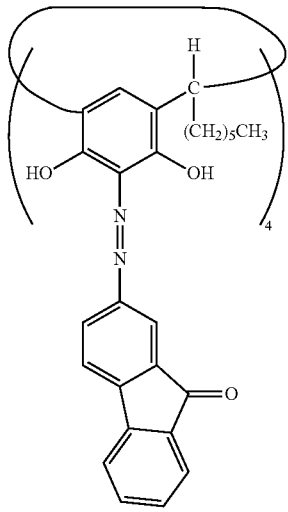

Exemplified Compound (2-7)

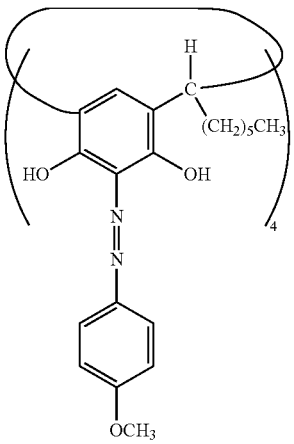

Exemplified Compound (2-8)

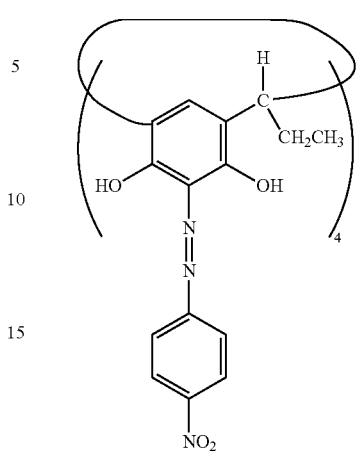

Exemplified Compound (2-9)

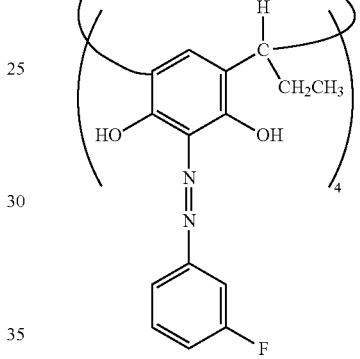

Examples of the gallium phthalocyanine constituting the gallium phthalocyanine crystal in which the compound represented by the formula (1) or the formula (2) of the present invention is contained include a gallium phthalocyanine having a halogen atom, a hydroxy group, or an alkoxy group as an axial ligand at a gallium atom in the molecule thereof. A gallium phthalocyanine having a substituent such as a halogen atom in its phthalocyanine ring is also included.

Of such gallium phthalocyanine crystals, hydroxygallium phthalocyanine crystals, bromogallium phthalocyanine crystals, or iodogallium phthalocyanine crystals each having excellent sensitivity are preferred because the present invention effectively acts. The hydroxygallium phthalocyanine crystal has a hydroxy group as an axial ligand at a gallium atom in the molecule thereof. The bromogallium phthalocyanine crystal has a bromine atom as an axial ligand at a gallium atom in the molecule thereof. The iodogallium phthalocyanine crystal has an iodine atom as an axial ligand at a gallium atom in the molecule thereof.

In addition, of such gallium phthalocyanine crystals, the following crystals are preferred:

a hydroxygallium phthalocyanine crystal having peaks at Bragg angles $2\theta\pm0.2°$ of 7.4° and 28.3° in CuKα X-ray diffraction;

a hydroxygallium phthalocyanine crystal having peaks at Bragg angles $2\theta\pm0.2°$ of 7.4°, 16.6°, 21.8°, 25.5°, and 28.3° in CuKα X-ray diffraction;

a bromogallium phthalocyanine crystal having peaks at Bragg angles $2\theta\pm0.2°$ of 7.4°, 27.1°, and 28.4° in CuKα X-ray diffraction; and an iodogallium phthalocyanine crystal having peaks at Bragg angles 2θ±0.2° of 20.4°, 27.1°, 29.0°, and 33.2° in CuKα X-ray diffraction.

Of those, a hydroxygallium phthalocyanine crystal having peaks at Bragg angles 2θ of 7.4°±0.3° and 28.3°±0.3° in CuKα X-ray diffraction is more preferred.

In addition, the gallium phthalocyanine crystal is preferably a gallium phthalocyanine crystal in which N,N-dimethylformamide is further contained.

The content of the compound represented by the formula (1) or the formula (2) contained in the gallium phthalocyanine crystal is preferably 0.03 mass % or more and 3.0 mass % or less with respect to the mass of the gallium phthalocyanine crystal.

The gallium phthalocyanine crystal in which the compound represented by the formula (1) or the formula (2) (hereinafter sometimes referred to as arene compound of the present invention) is contained means that the compound represented by the formula (1) or the formula (2) is incorporated into the crystal.

A production method for the gallium phthalocyanine crystal in which the compound represented by the formula (1) or the formula (2) is contained is described.

The gallium phthalocyanine crystal in which the arene compound of the present invention is contained is obtained through the step of subjecting a gallium phthalocyanine obtained by an acid pasting method and the arene compound of the present invention, which are mixed in a solvent, to wet milling treatment to perform crystal transformation.

The milling treatment to be performed here is, for example, a treatment to be performed with a milling apparatus such as a sand mill or a ball mill together with a dispersant such as a glass bead, a steel bead, or an alumina ball. A milling time is preferably about 4 to 72 hours. A particularly preferred method is as described below. The sample is taken every 4 to 8 hours and the Bragg angle of the crystal is identified. The amount of the dispersant to be used in the milling treatment is preferably 10 to 50 times as large as that of the gallium phthalocyanine on a mass basis. In addition, examples of the solvent to be used include: an amide-based solvent such as N,N-dimethylformamide, N-methylformamide, N-methylacetamide, or N-methylpropionamido; a halogen-based solvent such as chloroform; an ether-based solvent such as tetrahydrofuran; and a sulfoxide-based solvent such as dimethyl sulfoxide. The usage of the solvent is preferably 5 to 30 times as large as that of the gallium phthalocyanine on a mass basis. The usage of the compound represented by the formula (1) or the formula (2) is preferably 0.1 to 5 times as large as that of the gallium phthalocyanine on a mass basis.

Whether the gallium phthalocyanine crystal of the present invention contains or not in itself the arene compound of the present invention is determined by analyzing data on the NMR measurement and thermogravimetric (TG) measurement of the resultant gallium phthalocyanine crystal.

For example, in the case where the milling treatment or a washing step after the milling is performed with a solvent capable of dissolving the arene compound of the present invention, the resultant gallium phthalocyanine crystal is subjected to NMR measurement. When the arene compound of the present invention is detected, it can be judged that the arene compound of the present invention is contained in the crystal.

On the other hand, in the case where the arene compound of the present invention is insoluble in the solvent used in the milling treatment and is also insoluble in the solvent for the washing after the milling, when the resultant gallium phthalocyanine crystal is subjected to NMR measurement and the arene compound of the present invention is detected, a judgment is made by the following method.

The gallium phthalocyanine crystal obtained by adding the arene compound of the present invention, a gallium phthalocyanine crystal prepared in the same manner except for not adding the arene compound of the present invention, and the arene compound alone of the present invention are separately subjected to TG measurement. When the result of the TG measurement of the gallium phthalocyanine crystal obtained by adding the arene compound of the present invention can be interpreted as one obtained by merely mixing the separately measured results of the gallium phthalocyanine crystal obtained without adding the arene compound of the present invention and the arene compound of the present invention at a predetermined ratio, the gallium phthalocyanine crystal can be interpreted as being a mixture with the arene compound of the present invention, or as merely having the arene compound of the present invention adhering to its surface.

On the other hand, when the result of the TG measurement of the gallium phthalocyanine crystal obtained by adding the arene compound of the present invention shows a weight reduction occurring at a higher temperature than that in the case of the result of the TG measurement of the arene compound alone of the present invention as compared to the result of the TG measurement of the phthalocyanine crystal obtained without adding the arene compound of the present invention, it can be judged that the arene compound of the present invention is contained in the gallium phthalocyanine crystal.

The TG measurement, X-ray diffraction measurement, and NMR measurement of the gallium phthalocyanine crystal of the present invention were performed under the following conditions.

(TG Measurement)
Used measuring apparatus: TG/DTA simultaneous measurement apparatus (trade name: TG/DTA220U) manufactured by Seiko Instruments Inc.
Atmosphere: under nitrogen flow (300 cm/min)
Measurement range: 35° C. to 600° C.
Temperature increasing rate: 10° C./min
(Powder X-Ray Diffraction Measurement)
Used measuring apparatus: X-ray diffractometer RINT-TTRII manufactured by Rigaku Corporation
X-ray tube bulb: Cu
Tube voltage: 50 KV
Tube current: 300 mA
Scanning method: 2θ/θ scan
Scanning rate: 4.0°/min
Sampling interval: 0.02°
Start angle (2θ): 5.0°
Stop angle (2θ): 40.0°
Attachment: standard sample holder
Filter: not used
Incident monochromator: used
Counter monochromator: not used
Divergence slit: open
Divergence longitudinal restriction slit: 10.00 mm
Scattering slit: open
Light-receiving slit: open
Flat monochromator: used
Counter: scintillation counter
(NMR Measurement)
Used measuring apparatus: AVANCE III 500 manufactured by BRUKER
Solvent: deuterated sulfuric acid ($D_2SO_4$)

The gallium phthalocyanine crystal in which the compound represented by the formula (1) or the formula (2) of the present invention is contained is excellent in function as a photoconductor and is hence applicable to a solar cell, a sensor, a switching element, or the like as well as to an electrophotographic photosensitive member.

Next, the case where the gallium phthalocyanine crystal in which the compound represented by the formula (1) or the formula (2) of the present invention is contained is applied as a charge-generating substance in an electrophotographic photosensitive member is described.

Photosensitive layers are classified into a photosensitive layer formed of a single layer containing both the charge-generating substance and a charge-transporting substance (single-layer type photosensitive layer), and a photosensitive layer obtained by laminating a charge-generating layer containing the charge-generating substance and a charge-transporting layer containing the charge-transporting substance (laminated type photosensitive layer). It should be noted that the charge-generating layer may be laminated on the charge-transporting layer and vice versa.

The support to be used in the present invention is preferably a support having conductivity (conductive support). As the support, there may be used, for example, aluminum, an aluminum alloy, copper, zinc, stainless, vanadium, molybdenum, chromium, titanium, nickel, indium, gold, and platinum. In addition, there may be used: a plastic (e.g., polyethylene, polypropylene, polyvinyl chloride, polyethylene terephthalate, an acrylic resin, or polyfluoroethylene) having a layer of aluminum, an aluminum alloy, indium oxide, tin oxide, or an indium oxide-tin oxide alloy formed into a film by vacuum vapor deposition; a support obtained by coating a plastic or the above-mentioned support with conductive particles (e.g., aluminum particles, titanium oxide particles, tin oxide particles, zinc oxide particles, carbon black, or silver particles) and a binder resin; a support obtained by impregnating a plastic or paper with conductive particles; a plastic containing a conductive polymer; and the like.

In the present invention, an undercoat layer having a barrier function and an adhesion function (sometimes referred to as "barrier layer" or "intermediate layer") may be provided between the support and the photosensitive layer.

As the material for the undercoat layer, there may be used polyvinyl alcohol, polyethylene oxide, ethyl cellulose, methyl cellulose, casein, polyamides (e.g., nylon 6, nylon 66, nylon 610, a copolymer nylon, and an N-alkoxymethylated nylon), polyurethane, glue, aluminum oxide, gelatin, and the like. The thickness of the undercoat layer is 0.1 to 10 μm, preferably 0.5 to 5 μm.

When the single-layer type photosensitive layer is formed, the formation can be performed by: mixing the charge-generating substance made of the gallium phthalocyanine crystal according to the present invention and the charge-transporting substance into a binder resin solution; applying the mixed liquid onto the support; and drying the resultant applied film.

When the laminated type photosensitive layer is formed, the charge-generating layer can be formed by: applying an application liquid for a charge-generating layer obtained by dispersing the gallium phthalocyanine crystal according to the present invention in a binder resin solution; and drying the resultant applied film. Alternatively, the charge-generating layer can be formed by vapor deposition.

The charge-transporting layer may be formed by: applying an application liquid for a charge-transporting layer obtained by dissolving the charge-transporting substance and a binder resin in a solvent; and drying the resultant applied film.

Examples of the charge-transporting substance include a triarylamine-based compound, a hydrazone-based compound, a stilbene-based compound, a pyrazoline-based compound, an oxazole-based compound, a thiazole-based compound, and a triarylmethane-based compound.

Examples of the binder resin to be used for each layer include resins such as polyester, an acrylic resin, polyvinylcarbazole, a phenoxy resin, polycarbonate, polyvinyl butyral, polystyrene, polyvinyl acetate, polysulfone, polyarylate, vinylidene chloride, an acrylonitrile copolymer, and polyvinyl benzal.

An application method such as a dipping method, a spray coating method, a spinner coating method, a bead coating method, a blade coating method, or a beam coating method can be used as a method of applying the photosensitive layer.

When the photosensitive layer is of a single-layer type, its thickness is preferably 5 to 40 μm, more preferably 10 to 30 μm.

When the photosensitive layer is of a laminated type, the thickness of the charge-generating layer is preferably 0.05 to 3 μm, more preferably 0.1 to 0.5 μm. In addition, the thickness of the charge-transporting layer is preferably 5 to 40 μm, more preferably 8 to 20 μm.

When the photosensitive layer is of a laminated type, the content of the charge-generating substance is preferably 40 to 95 mass %, more preferably 60 to 85 mass % with respect to the total mass of the charge-generating layer. In addition, the content of the charge-transporting substance is preferably 30 to 95 mass %, more preferably 40 to 70 mass % with respect to the total mass of the charge-transporting layer.

When the photosensitive layer is of a single-layer type, the content of the charge-generating substance is preferably 2 to 20 mass % with respect to the total mass of the photosensitive layer. In addition, the content of the charge-transporting substance is preferably 30 to 70 mass % with respect to the total mass of the photosensitive layer.

When the gallium phthalocyanine crystal according to the present invention is used as a charge-generating substance, the substance can be mixed with any other charge-generating substance before use. In this case, the content of the gallium phthalocyanine crystal is preferably 70 mass % or more with respect to all charge-generating substances.

A protective layer may be formed on the photosensitive layer as required. The protective layer can be formed by: applying an application liquid for the protective layer, which is obtained by dissolving a resin in an organic solvent, onto the photosensitive layer to form an applied film; and drying the resultant applied film. Examples of the resin to be used for the protective layer include polyvinyl butyral, polyester, polycarbonate (e.g., polycarbonate Z or modified polycarbonate), nylon, polyimide, polyarylate, polyurethane, a styrene-butadiene copolymer, a styrene-acrylic acid copolymer, and a styrene-acrylonitrile copolymer. The thickness of the protective layer is preferably 0.5 to 10 μm.

A conductive particle, a UV absorber, or the like may be incorporated into the protective layer. Examples of the conductive particle include metal oxide particles such as a tin oxide particle.

FIG. 1 is a view illustrating an example of the schematic configuration of an electrophotographic apparatus including a process cartridge having the electrophotographic photosensitive member of the present invention.

A cylindrical (drum-shaped) electrophotographic photosensitive member 1 is rotationally driven about an axis 2 in a direction indicated by an arrow at a predetermined peripheral speed (process speed).

The surface of the electrophotographic photosensitive member 1 is charged to a predetermined positive or negative electric potential by a charging device 3 during the rotation process. Next, the charged surface of the electrophotographic photosensitive member 1 is irradiated with image exposure light 4 from an image exposing device (not shown) and then an electrostatic latent image corresponding to target image information is formed. The image exposure light 4 is, for example, light to be output from the image exposing device such as a slit exposure or a laser beam scanning exposure, the light having intensity modulated in correspondence with a time-series electrical digital image signal of the target image information.

The electrostatic latent image formed on the surface of the electrophotographic photosensitive member 1 is developed (subjected to normal development or reversal development) with toner stored in a developing device 5. Thus, a toner image is formed on the surface of the electrophotographic photosensitive member 1. The toner image formed on the surface of the electrophotographic photosensitive member 1 is transferred onto a transfer material 7 by a transferring device 6. At this time, a bias voltage opposite in polarity to the charge which the toner possesses is applied from a bias power source (not shown) to the transferring device 6. In addition, when the transfer material 7 is paper, the transfer material 7 is taken out from a sheet-feeding portion (not shown), and is then fed into a gap between the electrophotographic photosensitive member 1 and the transferring device 6 in synchronization with the rotation of the electrophotographic photosensitive member 1.

The transfer material 7 onto which the toner image has been transferred from the electrophotographic photosensitive member 1 is separated from the surface of the electrophotographic photosensitive member 1 and then conveyed to an image fixing device 8 where the transfer material is subjected to a treatment for fixing the toner image. Thus, the transfer material is printed out as an image-formed product (print or copy) to the outside of the electrophotographic apparatus.

The surface of the electrophotographic photosensitive member 1 after the transfer of the toner image onto the transfer material 7 is subjected to the removal of attached matters thereon such as the toner (transfer residual toner) by a cleaning device 9, thereby being cleaned. A cleaner-less system has been developed in recent years and hence the transfer residual toner can be directly removed with a developing device or the like. Further, the surface of the electrophotographic photosensitive member 1 is subjected to an antistatic treatment by pre-exposure light 10 from pre-exposing device (not shown) before being repeatedly used for image formation. It should be noted that when the charging device 3 is a contact charging device using a charging roller or the like, the pre-exposing device is not necessarily needed.

In the present invention, the following procedure can be adopted. Multiple components out of the components such as the electrophotographic photosensitive member 1, the charging device 3, the developing device 5, and the cleaning device 9 can be stored in a container and integrally supported to form a process cartridge. The process cartridge can be detachably mountable to the main body of the electrophotographic apparatus. For example, the following procedure can be adopted. At least one selected from the charging device 3, the developing device 5, and the cleaning device 9 is integrally supported with the electrophotographic photosensitive member 1 to form a cartridge. Then, the cartridge is used as a process cartridge 11 detachably mountable to the main body of the electrophotographic apparatus with a guiding device 12 such as a rail of the main body of the electrophotographic apparatus.

When the electrophotographic apparatus is a copying machine or a printer, the image exposure light 4 may be transmitted light or reflected light from a manuscript. Alternatively, the light may be light radiated by, for example, scanning a laser beam, driving an LED array, or driving a liquid crystal shutter array to be performed in accordance with a signal turned from the manuscript read with a sensor.

The electrophotographic photosensitive member 1 of the present invention is also widely applicable to the fields of application of electrophotography such as a laser beam printer, a CRT printer, an LED printer, a FAX, a liquid crystal printer, and laser plate making.

EXAMPLES

Hereinafter, the present invention is described in more detail by way of specific examples. However, the present invention is not limited to these examples. It should be noted that the thickness of each layer of any one of the electrophotographic photosensitive members in Examples and Comparative Examples was determined with an eddy-current thickness meter (Fischerscope manufactured by Fischer Instruments), or was determined from its mass per unit area by specific gravity conversion.

Example 1-1

Figure 2:
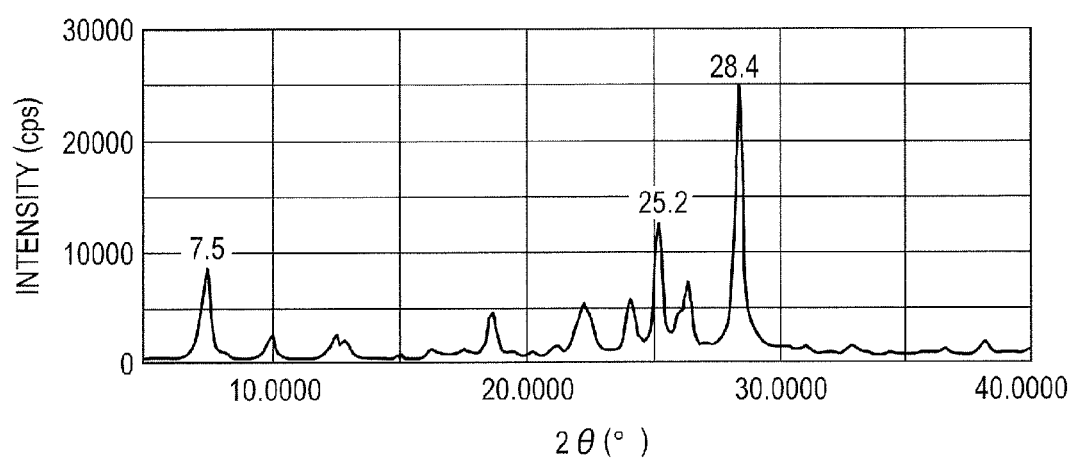
FIG. 2 is a powder X-ray diffraction pattern of a hydroxygallium phthalocyanine crystal obtained in Example 1-1.

Hydroxygallium phthalocyanine obtained by the same treatment as that of Example 1-1 subsequent to Synthesis Example 1 described in Japanese Patent Application Laid-Open No. 2011-94101 was prepared. 0.5 Part of the hydroxygallium phthalocyanine, 0.05 part of Exemplified Compound (1-1), and 10 parts of N,N-dimethylformamide were subjected to a milling treatment in a ball mill together with 20 parts of glass beads each having a diameter of 0.8 mm at room temperature (23° C.) for 42 hours. A gallium phthalocyanine crystal was taken out from the dispersion with N,N-dimethylformamide, and filtered, and then the residue on the filter was sufficiently washed with tetrahydrofuran. The residue was vacuum-dried to yield 0.42 part of a hydroxygallium phthalocyanine crystal. FIG. 2 shows the powder X-ray diffraction pattern of the resultant crystal.

TG measurement showed an increase in weight reduction amount in a range not less than 450° C., which was higher than the range of 200° C. to 360° C. showing a weight reduction caused by the evaporation of Exemplified Compound (1-1) alone. Thus, it is found that the compound represented by the formula (1) (Exemplified Compound (1-1)) is contained in the hydroxygallium phthalocyanine crystal obtained in Example 1-1.

In addition, NMR measurement confirmed that the hydroxygallium phthalocyanine crystal obtained in Example 1-1 contained 0.34 mass % of Exemplified Compound (1-1) and 2.21 mass % of N,N-dimethylformamide, the values being calculated from proton ratios.

Example 1-2

Figure 3:
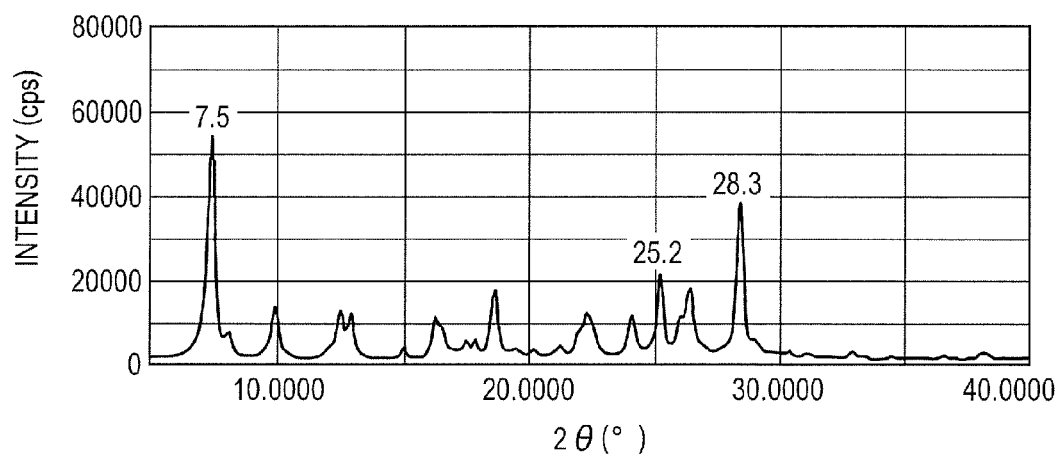
FIG. 3 is a powder X-ray diffraction pattern of a hydroxygallium phthalocyanine crystal obtained in Example 1-2.

0.25 Part of a hydroxygallium phthalocyanine crystal was obtained by the same treatment as that of Example 1-1 except that in Example 1-1, 0.05 part of Exemplified Compound (1-1) was changed to 0.5 part of Exemplified Compound (1-1). FIG. 3 shows the powder X-ray diffraction pattern of the resultant crystal.

TG measurement showed an increase in weight reduction amount in a range not less than 360° C., which was higher than the range of 200° C. to 360° C. showing a weight reduction caused by the evaporation of Exemplified Compound (1-1) alone. Thus, it is found that the compound represented by the formula (1) (Exemplified Compound (1-1)) is contained in the hydroxygallium phthalocyanine crystal obtained in Example 1-2.

In addition, NMR measurement confirmed that the hydroxygallium phthalocyanine crystal obtained in Example 1-2 contained 1.09 mass % of Exemplified Compound (1-1) and 2.60 mass % of N,N-dimethylformamide, the values being calculated from proton ratios.

Example 1-3

0.44 Part of a hydroxygallium phthalocyanine crystal was obtained by the same treatment as that of Example 1-1 except that in Example 1-1, Exemplified Compound (1-1) was changed to Exemplified Compound (1-2). The powder X-ray diffraction pattern of the resultant crystal was similar to that of FIG. 2.

TG measurement showed an increase in weight reduction amount in a range not less than 450° C., which was higher than the range of 300° C. to 400° C. showing a weight reduction caused by the evaporation of Exemplified Compound (1-2) alone. Thus, it is found that the compound represented by the formula (1) (Exemplified Compound (1-2)) is contained in the hydroxygallium phthalocyanine crystal obtained in Example 1-3.

In addition, NMR measurement confirmed that the hydroxygallium phthalocyanine crystal obtained in Example 1-3 contained 0.15 mass % of Exemplified Compound (1-2) and 2.00 mass % of N,N-dimethylformamide, the values being calculated from proton ratios.

Example 1-4

Figure 4:
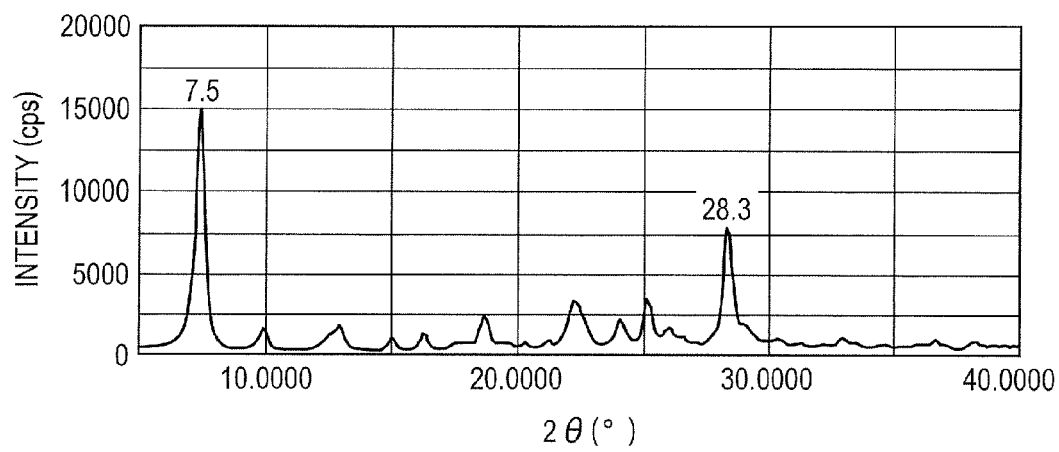
FIG. 4 is a powder X-ray diffraction pattern of a hydroxygallium phthalocyanine crystal obtained in Example 1-4.

0.41 Part of a hydroxygallium phthalocyanine crystal was obtained by the same treatment as that of Example 1-3 except that in Example 1-3, N,N-dimethylformamide was changed to dimethyl sulfoxide. FIG. 4 shows the powder X-ray diffraction pattern of the resultant crystal.

NMR measurement confirmed that the hydroxygallium phthalocyanine crystal obtained in Example 1-4 contained 0.05 mass % of Exemplified Compound (1-2) and 2.18 mass % of dimethyl sulfoxide, the values being calculated from proton ratios. It is found that Exemplified Compound (1-2) is contained in the phthalocyanine crystal because Exemplified Compound (1-2) is dissolved in dimethyl sulfoxide.

Example 1-5

0.45 Part of a hydroxygallium phthalocyanine crystal was obtained by the same treatment as that of Example 1-1 except that in Example 1-1, Exemplified Compound (1-1) was changed to Exemplified Compound (1-3). The powder X-ray diffraction pattern of the resultant crystal was similar to that of FIG. 2.

TG measurement showed an increase in weight reduction amount in a range not less than 450° C., which was higher than the range of 300° C. to 380° C. showing a weight reduction caused by the evaporation of Exemplified Compound (1-3) alone. Thus, it is found that the compound represented by the formula (1) (Exemplified Compound (1-3)) is contained in the hydroxygallium phthalocyanine crystal obtained in Example 1-5.

In addition, NMR measurement confirmed that the hydroxygallium phthalocyanine crystal obtained in Example 1-5 contained 0.17 mass % of Exemplified Compound (1-3) and 2.18 mass % of N,N-dimethylformamide, the values being calculated from proton ratios.

Example 1-6

0.38 Part of a hydroxygallium phthalocyanine crystal was obtained by the same treatment as that of Example 1-1 except that in Example 1-1, Exemplified Compound (1-1) was changed to Exemplified Compound (2-1). The powder X-ray diffraction pattern of the resultant crystal was similar to that of FIG. 2.

TG measurement showed an increase in weight reduction amount in a range not less than 360° C., which was higher than the range of 300° C. to 360° C. showing a weight reduction caused by the evaporation of Exemplified Compound (2-1) alone. Thus, it is found that the compound represented by the formula (2) (Exemplified Compound (2-1)) is contained in the hydroxygallium phthalocyanine crystal obtained in Example 1-6.

In addition, NMR measurement confirmed that the hydroxygallium phthalocyanine crystal obtained in Example 1-6 contained 1.72 mass % of Exemplified Compound (2-1) and 2.32 mass % of N,N-dimethylformamide, the values being calculated from proton ratios.

Comparative Example 1-1

0.4 Part of a hydroxygallium phthalocyanine crystal was obtained by the same treatment as that of Example 1-1 except that in Example 1-1, Exemplified Compound (1-1) was not added. The powder X-ray diffraction pattern of the resultant hydroxygallium phthalocyanine crystal was similar to that of FIG. 3.

Example 2-1

A solution formed of 60 parts of barium sulfate particles coated with tin oxide (trade name: Passtran PC1, manufactured by MITSUI MINING & SMELTING CO., LTD.), 15 parts of titanium oxide particles (trade name: TITANIX JR, manufactured by TAYCA CORPORATION), 43 parts of a resole-type phenol resin (trade name: Phenolite J-325, manufactured by DIC Corporation, solid content: 70 mass %), 0.015 part of a silicone oil (trade name: SH28PA, manufactured by Dow Corning Toray Co., Ltd.), 3.6 parts of a silicone resin (trade name: Tospearl 120, manufactured by Momentive Performance Materials Inc.), 50 parts of 2-methoxy-1-propanol, and 50 parts of methanol was subjected to a dispersion treatment in a ball mill for 20 hours. Thus, an application liquid for a conductive layer was prepared.

The application liquid for a conductive layer was applied onto an aluminum cylinder (having a diameter of 24 mm) as a support by dip coating to form an applied film and then the resultant applied film was dried for 30 minutes at 140° C. Thus, a conductive layer having a thickness of 15 μm was formed.

Next, 10 parts of a copolymer nylon resin (trade name: Amilan CM8000, manufactured by Toray Industries, Inc.) and 30 parts of a methoxymethylated 6-nylon resin (trade name: Toresin EF-30T, manufactured by Nagase ChemteX Corporation) were dissolved in a mixed solvent of 400 parts of methanol and 200 parts of n-butanol. Thus, an application liquid for an undercoat layer was prepared.

The application liquid for an undercoat layer was applied onto the conductive layer by dip coating and then the resultant applied film was dried. Thus, an undercoat layer having a thickness of 0.5 µm was formed.

Next, 10 parts of the hydroxygallium phthalocyanine crystal (charge-generating substance) obtained in Example 1-1, 5 parts of polyvinyl butyral (trade name: S-LEC BX-1, manufactured by SEKISUI CHEMICAL CO., LTD.), and 250 parts of cyclohexanone were loaded into a sand mill using glass beads each having a diameter of 1 mm, and were then subjected to a dispersion treatment for 1 hour. The resultant was diluted with 250 parts of ethyl acetate. Thus, an application liquid for a charge-generating layer was prepared.

The application liquid for a charge-generating layer was applied onto the undercoat layer by dip coating and then the resultant applied film was dried for 10 minutes at 100° C. Thus, a charge-generating layer having a thickness of 0.16 µm was formed.

Next, 8 parts of a compound (charge-transporting substance) represented by the following formula (3) and 10 parts of polycarbonate (trade name: Iupilon Z-200, manufactured by MITSUBISHI GAS CHEMICAL COMPANY, INC.) were dissolved in 70 parts of monochlorobenzene. Thus, an application liquid for a charge-transporting layer was prepared.

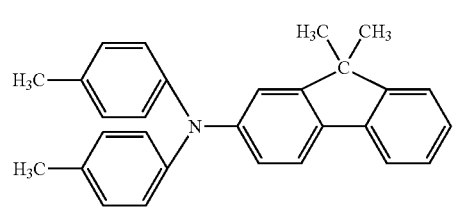

(3)

The application liquid for a charge-transporting layer was applied onto the charge-generating layer by dip coating and then the resultant applied film was dried for 1 hour at 110° C. Thus, a charge-transporting layer having a thickness of 23 µm was formed.

Thus, a cylindrical (drum-shaped) electrophotographic photosensitive member of Example 2-1 was produced.

Example 2-2

An electrophotographic photosensitive member of Example 2-2 was produced in the same manner as in Example 2-1 except that in Example 2-1, the hydroxygallium phthalocyanine crystal used in the preparation of the application liquid for a charge-generating layer was changed to the hydroxygallium phthalocyanine crystal obtained in Example 1-2.

Example 2-3

An electrophotographic photosensitive member of Example 2-3 was produced in the same manner as in Example 2-1 except that in Example 2-1, the hydroxygallium phthalocyanine crystal used in the preparation of the application liquid for a charge-generating layer was changed to the hydroxygallium phthalocyanine crystal obtained in Example 1-3.

Example 2-4

An electrophotographic photosensitive member of Example 2-4 was produced in the same manner as in Example 2-1 except that in Example 2-1, the hydroxygallium phthalocyanine crystal used in the preparation of the application liquid for a charge-generating layer was changed to the hydroxygallium phthalocyanine crystal obtained in Example 1-4.

Example 2-5

An electrophotographic photosensitive member of Example 2-5 was produced in the same manner as in Example 2-1 except that in Example 2-1, the hydroxygallium phthalocyanine crystal used in the preparation of the application liquid for a charge-generating layer was changed to the hydroxygallium phthalocyanine crystal obtained in Example 1-5.

Example 2-6

An electrophotographic photosensitive member of Example 2-6 was produced in the same manner as in Example 2-1 except that in Example 2-1, the hydroxygallium phthalocyanine crystal used in the preparation of the application liquid for a charge-generating layer was changed to the hydroxygallium phthalocyanine crystal obtained in Example 1-6.

Comparative Example 2-1

An electrophotographic photosensitive member of Comparative Example 2-1 was produced in the same manner as in Example 2-1 except that in Example 2-1, the hydroxygallium phthalocyanine crystal used in the preparation of the application liquid for a charge-generating layer was changed to the hydroxygallium phthalocyanine crystal obtained in Comparative Example 1-1.

Comparative Example 2-2

An electrophotographic photosensitive member of Comparative Example 2-2 was produced in the same manner as in Comparative Example 2-1 except that in Comparative Example 2-1, 10 parts of the hydroxygallium phthalocyanine crystal obtained in Comparative Example 1-1 and 0.1 part of Exemplified Compound (1-1) were added at the preparation of the application liquid for a charge-generating layer.

Comparative Example 2-3

An electrophotographic photosensitive member of Comparative Example 2-3 was produced in the same manner as in Comparative Example 2-2 except that in Comparative Example 2-2, Exemplified Compound (1-1) used in the preparation of the application liquid for a charge-generating layer was changed to Exemplified Compound (2-1).

Evaluations of Examples 2-1 to 2-6 and Comparative Examples 2-1 to 2-3

The electrophotographic photosensitive members of Examples 2-1 to 2-6 and Comparative Examples 2-1 to 2-3 were subjected to a ghost image evaluation.

Used as an electrophotographic apparatus for the evaluation was a laser beam printer manufactured by Hewlett-Packard Japan, Ltd. (trade name: Color Laser Jet CP3525dn) reconstructed as described below. That is, the printer was reconstructed so as to operate while pre-exposure was not turned on, and a charging condition and the image exposure value were variable. In addition, the printer was reconstructed so as to operate even when any one of the produced electrophotographic photosensitive members was mounted on a process cartridge for a cyan color and the cartridge was attached to a station for the cyan process cartridge, and a process cartridge for any other color was not attached on the main body of the printer.

Upon output of an image, only the process cartridge for a cyan color was attached to the main body and a monochromatic image formed with a cyan toner alone was output.

First, under a normal-temperature and normal-humidity environment having a temperature of 23° C. and a relative humidity of 55% RH, the charging condition and the image exposure value were adjusted so that a dark portion potential and a light portion potential at an initial stage were −500 V and −100 V, respectively. The surface potential of the drum-shaped electrophotographic photosensitive member upon setting of the potential was measured as described below. The cartridge was reconstructed, a potential probe (trade name: model 6000B-8, manufactured by TREK JAPAN) was mounted at a development position, and then an electric potential at the central portion of the cylindrical electrophotographic photosensitive member was measured with a surface potentiometer (trade name: model 344, manufactured by TREK JAPAN).

After that, the ghost image evaluation was performed under the same conditions. After that, a 1,000-sheet-passing durability test was performed, and the ghost image evaluation was performed immediately after the durability test and 15 hours after the durability test. Table 1 shows the results of the evaluation under the normal-temperature and normal-humidity environment.

Next, the electrophotographic photosensitive member was left to stand under a low-temperature and low-humidity environment having a temperature of 15° C. and a relative humidity of 10% RH for 3 days together with the electrophotographic apparatus for the evaluation. After that, the ghost image evaluation was performed. Then, a 1,000-sheet-passing durability test was performed under the same condition, and the ghost image evaluation was performed immediately after the durability test and 15 hours after the durability test. Table 1 shows the results of the evaluation under the low-temperature and low-humidity environment together.

It should be noted that the sheet-passing durability test was performed under such a condition that an E-letter image was printed on A4-size plain paper at a printing rate of 1% with a cyan color alone.

In addition, a method for the ghost image evaluation is as described below.

The ghost image evaluation was performed with a total of eight ghost images output in the following order. A solid white image was output on the first sheet. After that, four kinds of ghost charts were each output on one sheet, i.e., were output on a total of four sheets. Next, a solid black image was output on one sheet. After that, the four kinds of ghost charts were each output on one sheet, i.e., were output on a total of four sheets again. The ghost charts to be classified into ranks were as described below. Four solid black squares 25 mm on a side were arranged at an equal interval and parallel to one another in a solid white background ranging from a print image starting position (10 mm from the upper end of paper) to a distance of 30 mm, and in a range distant from the print image starting position by more than 30 mm, four kinds of halftone print patterns were output.

The four kinds of ghost charts are charts different from one another only in halftone pattern in the range distant from the print image starting position by more than 30 mm, and the halftone patterns are the following four kinds:

(1) a print (laser exposure) pattern in which one dot is laterally* printed every other space;

(2) a print (laser exposure) pattern in which two dots are laterally* printed every two spaces;

(3) a print (laser exposure) pattern in which two dots are laterally* printed every three spaces; and (4) a print (laser exposure) pattern of a knight pattern (a pattern in which two dots are printed among six squares like the movement of a knight in Japanese chess).

*: The term "laterally" refers to the scanning direction of a laser scanner (the horizontal direction in output paper).

The ghost images were classified into ranks as described below. It should be noted that it was judged that the effect of the present invention was not sufficiently obtained at each of the ranks 4, 5, and 6.

Rank 1: No ghost is observed in each ghost chart.

Rank 2: A ghost is slightly observed in a specific ghost chart.

Rank 3: A ghost is slightly observed in each ghost chart.

Rank 4: A ghost is observed in a specific ghost chart.

Rank 5: A ghost is observed in each ghost chart.

Rank 6: A ghost is clearly observed in a specific ghost chart.

TABLE 1

Results of ghost image evaluation

| | Under normal-temperature and normal-humidity environment | | | Under low-temperature and low-humidity environment | | |
|---|---|---|---|---|---|---|
| | Initial stage Ghost rank | Immediately after durability test Ghost rank | 15 Hours after durability test Ghost rank | Initial stage Ghost rank | Immediately after durability test Ghost rank | 15 Hours after durability test Ghost rank |
| Example 2-1 | 2 | 2 | 2 | 2 | 3 | 3 |
| Example 2-2 | 2 | 3 | 2 | 2 | 3 | 3 |
| Example 2-3 | 2 | 3 | 2 | 2 | 3 | 3 |
| Example 2-4 | 2 | 3 | 3 | 3 | 3 | 3 |
| Example 2-5 | 2 | 2 | 2 | 2 | 3 | 2 |
| Example 2-6 | 2 | 2 | 2 | 2 | 3 | 2 |

TABLE 1-continued

| | Results of ghost image evaluation | | | | | |
|---|---|---|---|---|---|---|
| | Under normal-temperature and normal-humidity environment | | | Under low-temperature and low-humidity environment | | |
| | Initial stage Ghost rank | Immediately after durability test Ghost rank | 15 Hours after durability test Ghost rank | Initial stage Ghost rank | Immediately after durability test Ghost rank | 15 Hours after durability test Ghost rank |
| Comparative Example 1-1 | 4 | 5 | 4 | 5 | 6 | 5 |
| Comparative Example 1-2 | 2 | 3 | 3 | 3 | 4 | 4 |
| Comparative Example 1-3 | 2 | 3 | 3 | 4 | 4 | 4 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2012-273718, filed Dec. 14, 2012, and No. 2013-245137, filed Nov. 27, 2013 which are hereby incorporated by reference herein in their entirety.

The invention claimed is:

1. An electrophotographic photosensitive member comprising:
    a support; and
    a photosensitive layer formed on the support;
    wherein the photosensitive layer comprises:
    a gallium phthalocyanine crystal in which a compound represented by the following formula (1) is contained:

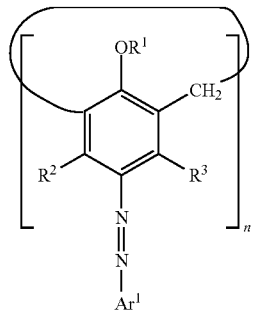

Formula (1)

wherein,
n represents an integer selected from 4 to 8,
n pieces of $R^1$ may be identical or different from each other, and represent a hydrogen atom or a substituted or unsubstituted alkyl group,
n pieces of $R^2$ may be identical or different from each other, and represent a hydrogen atom or an alkyl group,
n pieces of $R^3$ may be identical or different from each other, and represent a hydrogen atom or an alkyl group, and
n pieces of $Ar^1$ may be identical or different from each other, and represent a substituted or unsubstituted aromatic hydrocarbon ring group, a substituted or unsubstituted hetero ring group, or a mono-valent group formed by a combination of a plurality of groups selected from the group consisting of a substituted aromatic hydrocarbon ring group, an unsubstituted aromatic hydrocarbon ring group, a substituted hetero ring group, and an unsubstituted hetero ring group.

2. The electrophotographic photosensitive member according to claim 1, wherein at least two pieces of the $R^1$ represent an alkyl group.

3. The electrophotographic photosensitive member according to claim 1, wherein at least one piece of the $Ar^1$ represents a phenyl group having at least one group selected from the group consisting of a cyano group, a nitro group, and a halogen atom.

4. The electrophotographic photosensitive member according to claim 3, wherein at least one piece of the $Ar^1$ represents a phenyl group having one of a cyano group and a nitro group at a meta-position thereof.

5. An electrophotographic photosensitive member comprising:
    a support; and
    a photosensitive layer formed on the support;
    wherein the photosensitive layer comprises:
    a gallium phthalocyanine crystal in which a compound represented by the following formula (2) is contained:

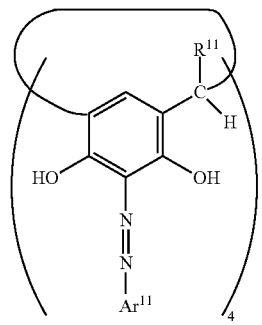

Formula (2)

wherein,
four pieces of $R^{11}$ may be identical or different from each other, and represent a hydrogen atom, a substituted or unsubstituted alkyl group, or a substituted or unsubstituted aryl group, and
four pieces of $Ar^{11}$ may be identical or different from each other, and represent a substituted or unsubstituted aromatic hydrocarbon ring group, a substituted or unsubstituted hetero ring group, or a mono-valent group formed by a combination of a plurality of groups selected from the group consisting of a substituted aromatic hydrocarbon ring group, an unsubstituted aromatic hydrocarbon ring group, a substituted hetero ring group, and an unsubstituted hetero ring group.

6. The electrophotographic photosensitive member according to claim 5, wherein all the four pieces of the $R^{11}$ represent an alkyl group.

7. The electrophotographic photosensitive member according to claim 5, wherein at least one piece of the $Ar^{11}$ represents a phenyl group having at least one group selected from the group consisting of a cyano group, a nitro group, and a halogen atom.

8. The electrophotographic photosensitive member according to claim 7, wherein at least one piece of the $Ar^{11}$ represents a phenyl group having one of a cyano group and a nitro group at a meta-position thereof.

9. The electrophotographic photosensitive member according to claim 1, wherein the gallium phthalocyanine crystal comprises a gallium phthalocyanine crystal in which N,N-dimethylformamide is contained.

10. The electrophotographic photosensitive member according to claim 1, wherein the gallium phthalocyanine crystal is a hydroxygallium phthalocyanine crystal.

11. The electrophotographic photosensitive member according to claim 10, wherein the hydroxygallium phthalocyanine crystal is a hydroxygallium phthalocyanine crystal having peaks at Bragg angles 2θ of 7.4°±0.3° and 28.3°±0.3° in CuKα X-ray diffraction.

12. A process cartridge detachably mountable to a main body of an electrophotographic apparatus, wherein the process cartridge integrally supports:
the electrophotographic photosensitive member according to claim 1; and
at least one device selected from the group consisting of a charging device, a developing device, a transferring device, and a cleaning device.

13. An electrophotographic apparatus comprising:
the electrophotographic photosensitive member according to claim 1;
a charging device;
an image exposing device;
a developing device; and
a transferring device.

14. A gallium phthalocyanine crystal in which a compound represented by one of the following formula (1) and the following formula (2) is contained:

Formula (1)

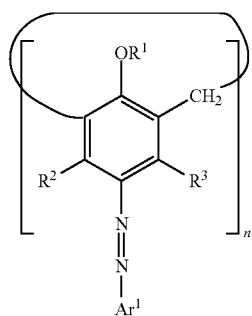

wherein,
n represents an integer selected from 4 to 8,
n pieces of $R^1$ may be identical or different from each other, and represent a hydrogen atom or a substituted or unsubstituted alkyl group,
n pieces of $R^2$ may be identical or different from each other, and represent a hydrogen atom or an alkyl group,
n pieces of $R^3$ may be identical or different from each other, and represent a hydrogen atom or an alkyl group, and
n pieces of $Ar^1$ may be identical or different from each other, and represent a substituted or unsubstituted aromatic hydrocarbon ring group, a substituted or unsubstituted hetero ring group, or a mono-valent group formed by a combination of a plurality of groups selected from the group consisting of a substituted aromatic hydrocarbon ring group, an unsubstituted aromatic hydrocarbon ring group, a substituted hetero ring group, and an unsubstituted hetero ring group; and Formula (2)

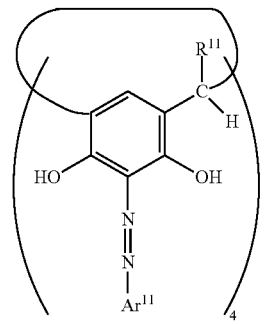

wherein,
four pieces of $R^{11}$ may be identical or different from each other, and represent a hydrogen atom, a substituted or unsubstituted alkyl group, or a substituted or unsubstituted aryl group, and
four pieces of $Ar^{11}$ may be identical or different from each other, and represent a substituted or unsubstituted aromatic hydrocarbon ring group, a substituted or unsubstituted hetero ring group, or a mono-valent group formed by a combination of a plurality of groups selected from the group consisting of a substituted aromatic hydrocarbon ring group, an unsubstituted aromatic hydrocarbon ring group, a substituted hetero ring group, and an unsubstituted hetero ring group.

15. The electrophotographic photosensitive member according to claim 5, wherein the gallium phthalocyanine crystal comprises a gallium phthalocyanine crystal in which N,N-dimethylformamide is contained.

16. The electrophotographic photosensitive member according to claim 5, wherein the gallium phthalocyanine crystal is a hydroxygallium phthalocyanine crystal.

17. The electrophotographic photosensitive member according to claim 16, wherein the hydroxygallium phthalocyanine crystal is a hydroxygallium phthalocyanine crystal having peaks at Bragg angles 2θ of 7.4°±0.3° and 28.3°±0.3° in CuKα X-ray diffraction.

18. A process cartridge detachably mountable to a main body of an electrophotographic apparatus, wherein the process cartridge integrally supports:
the electrophotographic photosensitive member according to claim 5; and
at least one device selected from the group consisting of a charging device, a developing device, a transferring device, and a cleaning device.

19. An electrophotographic apparatus comprising:
the electrophotographic photosensitive member according to claim 5;
a charging device;
an image exposing device;
a developing device; and
a transferring device.

\* \* \* \* \*